United States Patent
DeWald

(10) Patent No.: US 9,291,257 B2
(45) Date of Patent: Mar. 22, 2016

(54) POWER DISTRIBUTION UNIT WITH A FORCED LUBRICATION FLOW ASSEMBLY

(71) Applicant: DANA HEAVY VEHICLE SYSTEMS GROUP, LLC, Maumee, OH (US)

(72) Inventor: Gregory T. DeWald, Mattawan, MI (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 13/261,993

(22) PCT Filed: May 23, 2013

(86) PCT No.: PCT/US2013/042460
§ 371 (c)(1),
(2) Date: Nov. 25, 2014

(87) PCT Pub. No.: WO2013/181066
PCT Pub. Date: Dec. 5, 2013

(65) Prior Publication Data
US 2015/0087460 A1    Mar. 26, 2015

Related U.S. Application Data

(60) Provisional application No. 61/653,455, filed on May 31, 2012.

(51) Int. Cl.
*F16H 57/04* (2010.01)
*F04D 13/00* (2006.01)
(Continued)

(52) U.S. Cl.
CPC ............ *F16H 57/0483* (2013.01); *B60K 17/16* (2013.01); *B60K 17/344* (2013.01);
(Continued)

(58) Field of Classification Search
CPC ............ F16H 57/0479; F16H 57/0482; F16H 57/0483; F16H 57/0486; F16H 57/0456; F16H 57/0457; F16H 57/0458; F16H 57/0421; F16H 57/042; F16H 57/043
USPC .................................. 475/159, 160; 184/11.2
See application file for complete search history.

(56) References Cited

U.S. PATENT DOCUMENTS 2,655,054 A  10/1953  Kelley
3,550,724 A  12/1970  Vollmer
(Continued)

FOREIGN PATENT DOCUMENTS

DE    3929743 A1 *  9/1989
DE    19960157 A1 *  6/2001
(Continued)

*Primary Examiner* — Roger Pang
(74) *Attorney, Agent, or Firm* — Marshall & Melhorn, LLC

(57) ABSTRACT

A lubricant pump assembly for use with a power distribution unit for a vehicle, comprising a pump, a first rotating component, a second rotating component, and a lubricant. The pump has an inlet and an outlet. The inlet and the outlet are in fluid communication with a housing of the power distribution unit. The first rotating component is disposed in the housing of the power distribution unit. The second rotating component is disposed in the housing of the power distribution unit adjacent the first rotating component. The lubricant is disposed within the housing of the power distribution unit. The pump transfers a portion of the lubricant from the inlet to the outlet. The outlet is disposed adjacent the first rotating component and the second rotating component to dispose a portion of the lubricant therebetween.

21 Claims, 3 Drawing Sheets

(51) Int. Cl.
*B60K 17/344* (2006.01)
*B60K 17/16* (2006.01)
*F16H 48/10* (2012.01)

(52) U.S. Cl.
CPC ............... *F04D 13/00* (2013.01); *F16H 48/10* (2013.01); *F16H 57/043* (2013.01); *F16H 57/0436* (2013.01); *F16H 57/0441* (2013.01); *F16H 57/0456* (2013.01); *F16H 57/0479* (2013.01); *B60Y 2306/03* (2013.01); *F16H 57/042* (2013.01); *F16H 57/0482* (2013.01)

(56) References Cited

U.S. PATENT DOCUMENTS

| | | | |
|---|---|---|---|
| 3,618,711 | A | 11/1971 | Vollmer |
| 3,749,217 | A | 7/1973 | Bush et al. |
| 4,069,906 | A | 1/1978 | Handke |
| 4,616,736 | A | 10/1986 | Fox |
| 4,693,133 | A | 9/1987 | Tomita et al. |
| 4,719,998 | A | 1/1988 | Hiramatsu et al. |
| 4,829,850 | A | 5/1989 | Soloy |
| 4,946,409 | A | 8/1990 | Suzuki |
| 5,199,317 | A | 4/1993 | Moore et al. |
| 5,366,419 | A | 11/1994 | Oda |
| 5,404,963 | A | 4/1995 | Crepas et al. |
| 5,522,476 | A * | 6/1996 | Holman .................. 184/6.12 |
| 5,910,063 | A * | 6/1999 | Kato ......................... 475/159 |
| 6,041,904 | A | 3/2000 | Kuroda et al. |
| 6,076,646 | A | 6/2000 | Burns |
| 6,675,943 | B2 | 1/2004 | Organek et al. |
| 6,698,562 | B2 | 3/2004 | Teraoka et al. |
| 6,779,642 | B2 | 8/2004 | Arai et al. |
| 6,855,083 | B1 | 2/2005 | Wagle et al. |
| 6,997,841 | B2 | 2/2006 | Wagle et al. |
| 7,025,701 | B2 | 4/2006 | Cui et al. |
| 7,175,013 | B2 | 2/2007 | Burns et al. |
| 7,258,641 | B2 | 8/2007 | Green et al. |
| 7,261,195 | B2 | 8/2007 | Burns et al. |
| 7,287,634 | B2 | 10/2007 | Agner et al. |
| 7,326,142 | B2 | 2/2008 | Asahi et al. |
| 7,389,712 | B2 | 6/2008 | Himmelmann |
| 7,409,827 | B2 | 8/2008 | Yasuda et al. |
| 7,624,853 | B2 | 12/2009 | Ekonen et al. |
| 7,637,101 | B2 | 12/2009 | Uezono et al. |
| 7,828,130 | B2 | 11/2010 | Ekonen et al. |
| 7,954,612 | B2 | 6/2011 | Mogami et al. |
| 8,033,941 | B2 | 10/2011 | Nishida et al. |
| 2003/0217617 | A1 | 11/2003 | Sakamoto et al. |
| 2006/0269421 | A1 | 11/2006 | Sakikawa et al. |
| 2009/0247348 | A1 * | 10/2009 | Haupt et al. ................... 475/159 |
| 2011/0230292 | A1 * | 9/2011 | Komatsu et al. ............... 475/5 |
| 2013/0323015 | A1 * | 12/2013 | DeWald ......................... 415/1 |
| 2014/0166402 | A1 * | 6/2014 | Yanagida et al. ............ 184/6.12 |

FOREIGN PATENT DOCUMENTS

| | | |
|---|---|---|
| EP | 1582777 A2 | 10/2005 |
| EP | 2735463 A1 * | 10/2013 |
| GB | 910003 A | 11/1962 |
| JP | S62-162452 U | 10/1987 |
| WO | 02/057657 A1 | 7/2002 |

* cited by examiner

POWER DISTRIBUTION UNIT WITH A FORCED LUBRICATION FLOW ASSEMBLY

RELATED APPLICATIONS

This application claims priority to and the benefit of U.S. Provisional Patent Application No. 61/653,455 filed on May 31, 2012 which is incorporated by reference herein.

FIELD OF THE INVENTION

The field of the invention relates to power distribution devices. More particularly, the invention relates to a lubrication system for a vehicular power distribution device.

BACKGROUND OF THE INVENTION

The invention relates to power distribution units for vehicles and, more particularly, to a forced lubrication flow assembly for a power distribution unit.

Power distribution units for vehicles include an input and at least two outputs. The input is typically engaged with a power source, a transmission, or other drivetrain component. A first output is typically engaged with a first drive axle; however it is understood the first output may be engaged with a driveshaft or other drivetrain component. A second output is typically engaged with a driveshaft; however it is understood the second output may be engaged with a second drive axle or other drivetrain component. Typically, the power distribution unit has at least one clutching device for engaging the input with one of the outputs. The power distribution unit may also include a power divider for applying torque to two outputs of the power distribution unit.

The power distribution unit including the power divider significantly increases a number of components of the power distribution unit. Components of the power distribution unit that engage one another (such as gears) typically require lubrication to reduce friction and to dissipate heat. The power distribution unit may include a lubricant sump in which a portion of the components are completely or partially disposed in. Rotation of the components results in a distribution of the lubricant within the power distribution unit. The distribution of the lubricant may be inadequate for a portion of the components; particularly, the power divider may be inadequately lubricated due to at least one of obstruction of the power divider by other components and interference caused by the power divider or other components rotating at specific speeds.

It would be advantageous to develop a forced lubrication flow assembly for a power distribution unit that is reliable, adequately lubricates components of the power divider, and is powered by a rotating component of the power divider.

SUMMARY OF THE INVENTION

A lubrication system for a vehicle power distribution unit has an input shaft with a first end portion and a second end portion. A power divider is provided having a first output gear, a second output gear, and a pinion carrier with pinion gears rotationally mounted on pinion supports. The pinion carrier is directly connected to the second end portion of the input shaft. The first input gear is connected to the pinion gear. The first output gear has a fluid reflecting concave annular surface between a first end and a second end of the first output gear. A fluid distribution member has an inlet on an outer surface connected to a fluid pump. A fluid conduit extends through the fluid distribution member and had an outlet aimed at the concave annular surface.

A method of lubricating a vehicle power distribution unit comprises pumping a lubricant to an outer surface of the distribution member. Flowing the lubricant from the outer surface through a lubricant passage in the distribution member. Increasing the velocity of the lubricant by flowing the lubricant through a reduced area of the lubricant passage. Directing the lubricant at a concave portion of an output gear. And using the concave portion of the output gear to redirect the lubricant into pinion gears of a planetary interaxle differential. The method may also comprise controlling the lubricant level in the pinion carrier.

BRIEF DESCRIPTION OF THE FIGURES

The above will become readily apparent to those skilled in the art from the following detailed description when considered in the light of the accompanying drawings in which.

DETAILED DESCRIPTION OF THE INVENTION

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
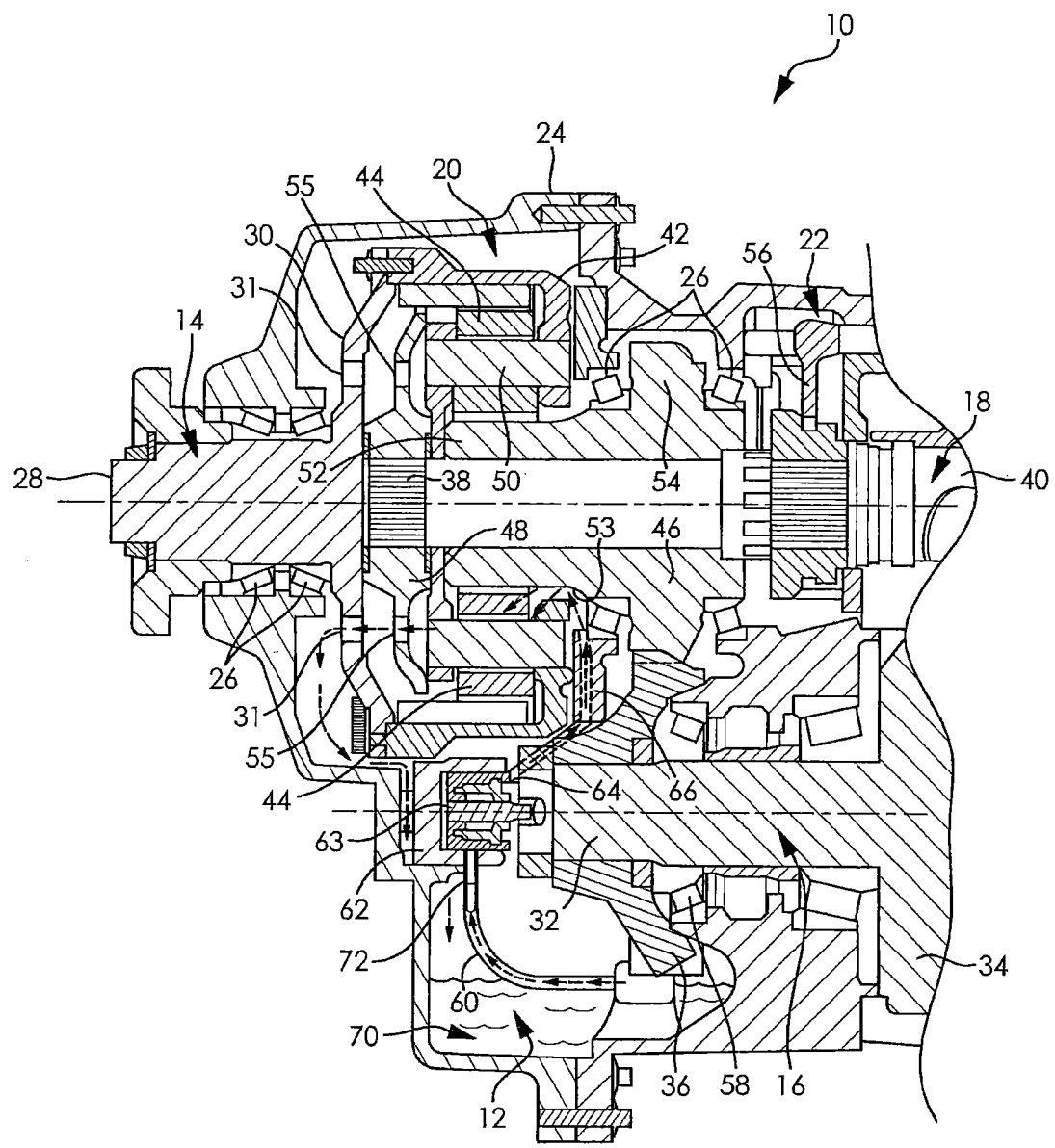
FIG. 1 is a schematic cross-section side view through one embodiment of a power distribution device.

FIG. 1 illustrates a power distribution unit 10 including a forced lubrication flow assembly 12 according to an embodiment of the invention. The power distribution unit 10 preferably comprises an input 14, a first output 16, a second output 18, a power divider 20, a clutching device 22, and the forced lubrication flow assembly 12. As shown, the forced lubrication flow assembly 12, the power divider 20, and the clutching device 22 are disposed within a power distribution unit housing 24. The input 14, the first output 16, and the second output 18 are partially disposed in the power distribution unit housing 24.

The input 14 is at least partially disposed in the power distribution unit housing 24. Preferably, the input 14 is an elongate member, however the input 14 may be any other shape. Bearings 26 disposed between the input 14 and the power distribution unit housing 24 permit the input 14 to rotate about an axis of the input 14. The input 14 has a first end portion 28 and a second end portion 30.

The first end portion 28 is adapted to be drivingly engaged with one of a power source, a transmission, a drive shaft, or other drivetrain component. A plurality of splines (not shown) may be formed in the first end portion 28.

The second end portion 30 is substantially cup shaped; however, it is understood other shapes may be used. A plurality of perforations 31 are formed through the second end portion 30. The plurality of perforations 31 may be located at a predetermined distance from an outer edge of the second end portion to facilitate draining of a lubricant therethrough.

The first output 16 includes a shaft portion 32 and a pinion portion 34. As shown in FIG. 1, the shaft portion 32 is integrally formed with the pinion portion 34; however, it is understood that the shaft portion 32 may be formed separate from the pinion portion. The first output 16 is drivingly engaged with the forced lubrication flow assembly 12 and a first drive gear 36. The first drive gear 36 is drivingly engaged with the first output 16 through a plurality of splines (not shown) formed in the first drive gear 36 and the first output 16. Bearings 26 disposed between the first output shaft 16 and the power distribution unit housing 24 support the first output 16 and permit the first output 16 to rotate about an axis of the first output shaft 16. The pinion portion 34 has gear teeth formed on an outer surface thereof. The pinion portion 34 may be one of a hypoid gear, a spiral bevel gear, a straight bevel gear, or any other gear known to those skilled in the art. The pinion portion 34 is drivingly engaged with a ring gear (not shown) of a first axle assembly (not shown).

The second output 18 is an elongate member collinear with the input 14. Bearings 32 disposed between the second output 18 and the power distribution unit housing 24 support the second output 18 and permit the second output 18 to rotate about an axis of the second output 18. The second output 18 has a first end 38 and a second end 40. The second end 40 is drivingly engaged with a second axle assembly (not shown).

The power divider 20 is a planetary inter-axle differential; however, it is understood that the power divider 20 may be any other differential device. The power divider 20 includes a pinion carrier 42, a plurality of driving pinions 44, a first output gear 46, and a second output gear 48.

The pinion carrier 42 is a substantially cup shaped body drivingly coupled to the outer edge of the second end portion 33 of the input 14. The pinion carrier 42 includes a plurality of pinion supports 50 protruding from a first side of the pinion carrier 42 into a cavity defined by the pinion carrier 42. As is known in the art, the pinion carrier 42 is also known as a planet carrier.

Each of the driving pinions 44 is rotatably disposed on the pinion supports 50 of the pinion carrier 42. Each of the driving pinions 44 have gear teeth formed on an outer surface thereof. As is known in the art, each of the driving pinions 44 is also known as a planet gear. Preferably, bearings are disposed between each of the driving pinions 44 and the pinion supports 50, however, the driving pinions 44 may be directly mounted on the pinion supports 50.

The first output gear 46 is a gear concentrically disposed about the second output 18. The first output gear 46 is an annular body having a first end 52, a middle portion 53, and a second end 54. The first end 52 and the second end 54 have gear teeth formed on an outer surface thereof. The gear teeth formed on the first end 52 are engaged with the gear teeth formed on the outer surface of each of the driving pinions 44. As is known in the art, the gear teeth formed on the first end 52 are known as a sun gear. The gear teeth formed on the second end 54 are engaged with gear teeth formed on an outer surface of the first drive gear 36. The middle portion 53 is a concave annular surface formed between the first end 52 and the second end 54; however, it is understood that the middle portion 53 may have other shapes.

The second output gear 48 is a gear concentrically disposed within the pinion carrier 42 and drivingly engaged with the first end 38 of the second output 18. The second output gear 48 is a substantially cup shaped body having an inner surface having gear teeth formed on. As is known in the art, the second output gear 48 is known as a ring gear. The gear teeth are engaged with the gear teeth formed on the outer surface of each of the driving pinions 21. A portion of the second output gear 48 is substantially disc shaped; however, it is understood other shapes may be used. A plurality of perforations 55 are formed through the second output gear 48. The plurality of perforations 55 may be located at a predetermined distance from an outer edge of the second output gear 48 to create a rotating dam that maintains a predetermined amount of lubricant within the pinion carrier 42. More particularly, the dam holds sufficient lubricant to at least partially submerge the pinions 44 and pinion supports 50. Excess lubricant is permitted to exit through the perforations 55.

The clutching device 22 is a dog style clutch disposed about the second output 18 and drivingly engaged therewith. The clutching device 22 may be moved axially along a plurality of splines formed in the second output 18. The clutching device 22 may also be a plate style clutch or any other style of clutch. The clutching device 22 has a plurality of teeth formed thereon for selectively engaging corresponding teeth formed in the first output gear 46. The clutching device 22 is urged into the engaged position or a disengaged position by a shift fork 56. An actuator (not shown) is drivingly engaged with the shift fork 56, is engaged to position the shift fork 56, and thus the clutching device 22, as directed by a controller (not shown). When the clutching device 22 is placed in the engaged position, the power divider 20 is locked and the first output gear 46 and the second output 18 rotate concurrently. When the clutching device 22 is placed in the disengaged position, the power divider 20 is unlocked and the first output gear 46 and the second output 18 may rotate with respect to one another.

The forced lubrication flow assembly 12 comprises an inlet filter 58, an inlet conduit 60, a pump housing 62, a pump 63, an outlet conduit 64, and a distribution member 66. The forced lubrication flow assembly 12 is in fluid communication with an interior of the power distribution unit housing 24.

The inlet filter 58 is a hollow member in fluid communication with the inlet conduit 28. The inlet filter 58 includes a porous portion 68. The porous portion 68 may be one of a screen, a cellulose based filter media, a synthetic filter media, or any other filtering device. The inlet filter 58 is positioned in a lubricant sump 70 of the power distribution unit housing 24. The lubricant sump 70 is a portion of the power distribution unit housing 24 the lubricant disposed therein collects. A portion of the inlet filter 58 may be adapted for coupling the inlet filter 58 to the inlet conduit 60. The inlet filter 58 may be coupled to the power distribution unit housing 24 in any conventional manner. The inlet filter 58 militates against particulates in the lubricant from entering the inlet filter 58.

The inlet conduit 60 is a hollow elongate member in fluid communication with an interior of the inlet filter 58 and the pump housing 62. The inlet conduit 60 may be formed from a flexible or a rigid tubing and may be coupled to the power distribution unit housing 24 in any conventional manner.

The pump housing 62 is fixedly disposed within a portion of the power distribution unit housing 24 and in fluid communication with the inlet conduit 60 and the outlet conduit 64. The pump housing 62 is a hollow body which sealingly receives the pump 63 and aligns the pump 63 with the first output 16. The pump housing 62 includes at least one threaded aperture 71 for receiving a fastener for coupling the pump housing 62 to the power distribution unit housing 24. The pump housing 62 includes a pump inlet 72 and a pump outlet 74.

The pump 63 is sealingly engaged with the pump housing 62, fluidly separating the pump inlet 72 from the pump outlet 74. The pump 63 is drivingly engaged with the shaft portion 32 of the first output 16. A pin 75 may be disposed through the pump housing 62 and into the pump 63 to militate against rotation of the pump 63 within the pump housing 62. The pump 63 is a gear pump; however, it is understood that any other type of pump may be used. When the first output 16 rotates, a portion of the pump 63 rotates, drawing the lubricant from the lubricant sump 70 through the inlet filter 58, the inlet conduit 60, and the pump inlet 72 and expelling the lubricant through the pump outlet 74.

The outlet conduit 64 is a hollow elongate member in fluid communication with the pump housing 62 and the distribution member 66. The outlet conduit 64 may be formed from a flexible or a rigid tubing and may be coupled to the power distribution unit housing 24 in any conventional manner.

The distribution member 66 is an annular body having a rectangular cross-section; however, it is understood that the distribution member may be integrally formed with the power distribution unit housing 24. The distribution member 66 is fixedly disposed within the power distribution unit housing 24. The distribution member 66 is disposed about the second output 18 and the first output gear 46. The distribution member 66 defines a lubricant passage 76 and a distribution outlet 78.

Figure 2:
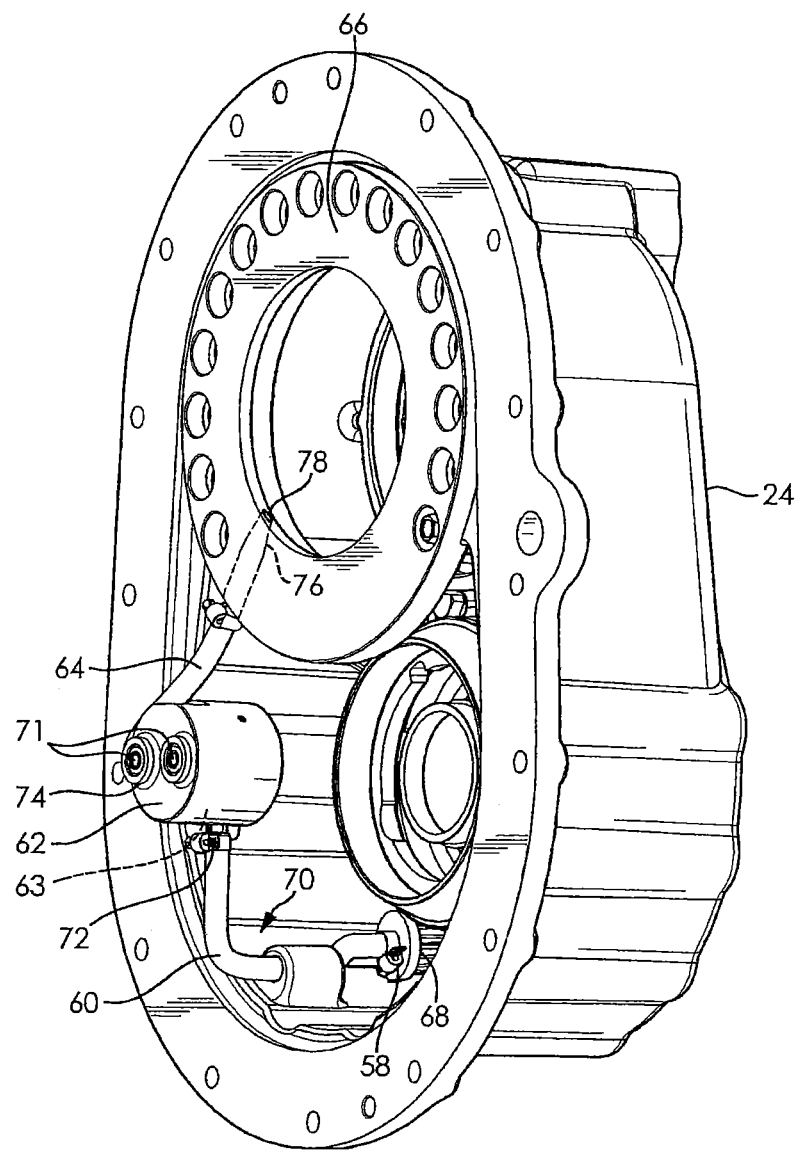
FIG. 2 is perspective view of one embodiment of a power distribution device housing and components located therein.
Figure 3:
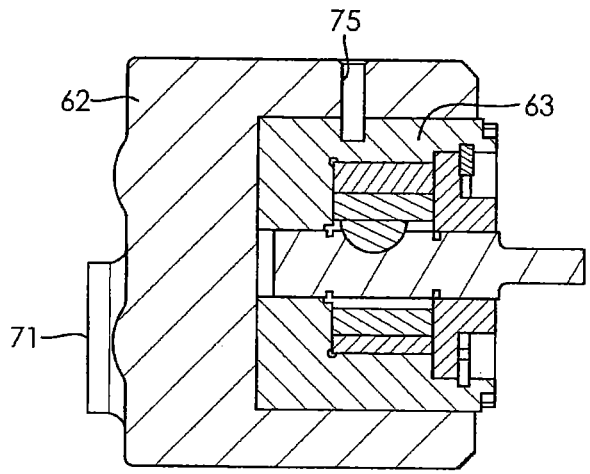
FIG. 3 is a schematic cross-section side view of one embodiment of a pump.
Figure 4:
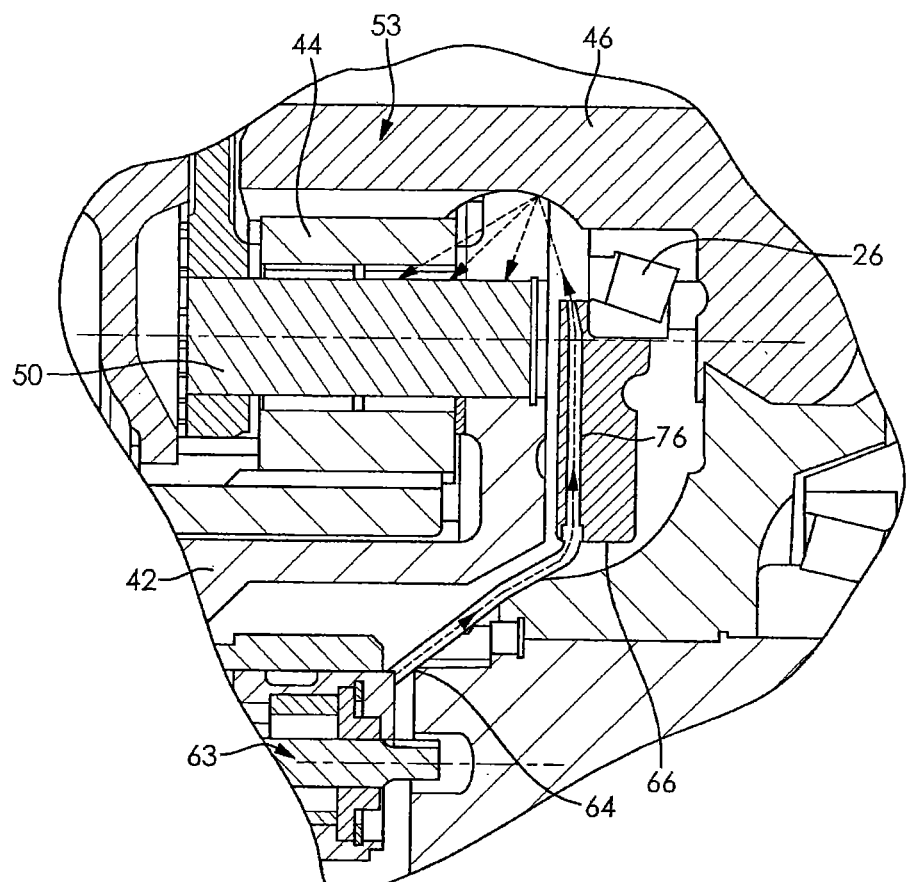
FIG. 4 is a schematic cross-section view of one embodiment of a fluid distribution member.

As shown in FIG. 2, the lubricant passage 76 extends from an outer edge of the distribution member 66 inwardly to the distribution outlet 78 and is in fluid communication with the outlet conduit 64 and the distribution outlet 78. The lubricant passage 76 has a circular cross-section and is oriented substantially perpendicular to the input 14 of the power distribution unit 10; however, it is understood that the lubricant passage 76 may have a cross-section of any other shape and may be oriented in any other manner. A portion of the lubricant passage 76 may be defined by a threaded surface formed adjacent the outer edge of the distribution member 66, into which the outlet conduit 64 is coupled.

As shown in FIG. 2, the distribution outlet 78 extends from the lubricant passage 76 to an inner edge of the distribution member 66 and is in fluid communication with the lubricant passage 76. The distribution outlet 78 has a circular cross-section and is oriented oblique with respect to an axis of the input 14 of the power distribution unit 10; however, it is understood that the distribution outlet 78 may have a cross-section of any other shape and may be oriented in any other manner. A cross-sectional area of the distribution outlet 78 is smaller than a cross-sectional area of the lubricant passage 76; however, it is understood that the cross-sectional area of the distribution outlet 78 may be about equal to the cross-sectional area of the lubricant passage 76.

In use, the forced lubrication flow assembly 12 facilitates lubrication of the power distribution unit 10. When a vehicle (not shown) the power distribution unit 10 is incorporated in is moving, the first output 16 rotates as the vehicle is driven. When the first output 16 rotates, a portion of the pump 63 rotates as the shaft portion 32 of the first output 16 rotates. Rotation of a portion of the pump 63 draws the lubricant from the lubricant sump 70 through the inlet filter 58, the inlet conduit 60, and the pump inlet 72. After passing through the pump 63, the lubricant exits the pump outlet 74 in a pressurized state. As a non-limiting example, the lubricant in the pressurized state may be greater than 200 pounds per square inch. The lubricant in the pressurized state flows through the outlet conduit 64, the lubricant passage 76, and the distribution outlet 78.

As mentioned hereinabove, the distribution outlet 78 has a cross-sectional area smaller than a cross-sectional area of the lubricant passage 76. Due to the reduction in the cross-sectional area, a velocity of the lubricant in the distribution outlet 78 increases. As a non-limiting example, the velocity of the lubricant in the distribution outlet 78 may be greater than 150 feet per second. The lubricant in the pressurized state exits the distribution outlet 78 in a stream. The distribution outlet 78 is oriented oblique with respect to the axis of the input 14, directing the stream of the lubricant to contact the middle portion 53 of the first output gear 46. The middle portion 53 deflects and distributes the stream of the lubricant within the second output gear 48, lubricating the first end 52 of the first output gear 46, the driving pinions 44, and the gear teeth formed on the inner surface of the second output gear 48. When a cavity formed between the pinion carrier 42 and the second output gear 48 collects a predetermined amount of the lubricant or movement of the power divider 20 agitates the lubricant in the cavity, the lubricant exits the cavity through the plurality of perforations 55 and enters a cavity formed between the second output gear 48 and the second end portion 30 of the input 14. When the cavity formed between the second output gear 48 and the second end portion 30 of the input 14 collects a predetermined amount of the lubricant or movement of the second output gear 48 or the input 14 agitates the lubricant in the cavity, the lubricant exits the cavity through the plurality of perforations 31 and collects in the lubricant sump 70 of the power distribution unit housing 24. The inside radius of the pinion carrier 42 has a smaller diameter than the perforations 55 to create the lubricant cavities and a rotating centrifugal lubricant dam of predetermined quantity. Preferably, the lubricant fills the cavities to the radial level of the perforations 55, or just below. The fill level may be determined while the power divider 20 rotates, and if that is the case, at a predetermined amount of rotation. Thus, it can be appreciate that the dam formed may be a centrifugal dam.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A lubrication system for a vehicle power distribution unit, comprising:
    an input shaft having a first end portion and a second end portion;
    a power divider comprising a first output gear, a second output gear, a pinion carrier having pinion gears rotationally mounted on pinion supports, said pinion carrier directly connected to said second end portion of said input shaft, and said first output gear connected to said pinion gears, said first output gear having a fluid reflecting concave annular surface between a first end and a second end of said first output gear, wherein said second output gear is cup-shaped and concentrically disposed within said pinion carrier;
    a fluid distribution member having an inlet on an outer surface connected to a fluid pump, a fluid conduit extending through said fluid distribution member, and a fluid distribution member outlet aimed at concave annular surface.

2. The system of claim 1, wherein said input shaft second end portion is cup-shaped with a plurality of lubricant perforations formed therein.

3. The system of claim 2, wherein said second output gear has a plurality of lubricant perforations formed therein.

4. The system of claim 1, further comprising a lubrication flow assembly comprising an inlet filter, an inlet conduit, a pump housing, a pump, an outlet conduit and said fluid distribution member.

5. The system of claim 4, wherein said pump is drivingly engaged with said first output gear.

6. The system of claim 1, wherein said fluid distribution member is a ring-shaped member concentric with said first output gear.

7. The system of claim 1, wherein said fluid distribution member fluid conduit is substantially perpendicular to said input shaft.

8. The system of claim 1, wherein said fluid distribution member outlet is oriented oblique to an axis of said input shaft.

9. The system of claim 1, wherein said fluid distribution member outlet has a smaller diameter than said fluid conduit.

10. The system of claim 3, wherein a fluid distribution path comprises said distribution member, said concave annular surface, said pinion gears and said input shaft second end portion lubricant perforations and said second output gear lubricant perforations.

11. The system of claim 3, wherein, measured from a centerline of said input shaft, a pinion carrier inner radius is less than a radius of the input shaft second end portion lubricant perforations and said second output gear lubricant perforations.

12. The system of claim 11, wherein a lubricant dam is formed between said pinion carrier inner radius and said input shaft second end portion lubricant perforations.

13. A method of lubricating a vehicle power distribution unit, comprising:
  pumping a lubricant to an outer surface of a ring-shaped distribution member;
  flowing said lubricant from said outer surface through a lubricant passage in said distribution member;
  increasing the velocity of said lubricant by flowing said lubricant through a reduced area of said lubricant passage;
  directing said lubricant at a concave portion of a first output gear;
  using said concave portion of said output gear to redirect said lubricant into pinion gears of a planetary interaxle differential;
  wherein said redirected lubricant comes in contact with a second output gear and said first output gear, said redirected lubricant exits a first cavity formed between a pinion carrier and said second output gear via a plurality of perforations in said second output gear.

14. The method of claim 13, wherein said lubricant from said second output gear plurality of perforations flows into a second cavity formed between said second output gear and a portion of an input.

15. The method of claim 14, wherein lubricant exits said second cavity via a plurality of perforations in said input.

16. The method of claim 15, wherein said lubricant from said second cavity returns to a sump for use by a pump.

17. The method of claim 16, wherein said first and second cavities maintain a level of lubricant at a centerline of pinion supports to keep said pinion gears on said pinion supports lubricated.

18. The method of claim 13, wherein said concave portion redirects said lubricant in a direction substantially opposite from which it came.

19. The method of claim 13, wherein the velocity of said lubricant is increased in said reduced area of said lubricant passage by restricting the diameter of said passageway and said lubricant is redirected by angling an outlet port of said passage.

20. The method of claim 15, wherein a rotating centrifugal lubricant dam is formed to lubricate pinions on said pinion carrier, said dam is located between an inner radius of said pinion carrier, said second output gear perforations and said input perforations.

21. A method of lubricating a vehicle power distribution unit, comprising:
  pumping a lubricant to an outer surface of a ring-shaped distribution member;
  flowing said lubricant from said outer surface through a lubricant passage in said distribution member;
  increasing the velocity of said lubricant by flowing said lubricant through a reduced area of said lubricant passage;
  directing said lubricant at a concave portion of an output gear;
  using said concave portion of said output gear to redirect said lubricant into pinion gears of a planetary interaxle differential.

* * * * *